United States Patent [19]
Peng

[11] Patent Number: 5,515,206
[45] Date of Patent: May 7, 1996

[54] MULTI-FACET LENS COMPONENT

[75] Inventor: Gentle Peng, G2, Fl.2, No. 74, Alley 25, Lane 734, Sec. 2, Chung-Hsing Rd., Hsin-Chu, Taiwan

[73] Assignees: Gentle Peng; Chieh-Yu Lin; Wei-Chang W. Liauh, all of Ellicott City, Md.

[21] Appl. No.: 340,694

[22] Filed: Nov. 15, 1994

[51] Int. Cl.$^6$ .............................. G02B 3/10; G02B 15/02
[52] U.S. Cl. ............................................. 359/721; 359/672
[58] Field of Search ...................... 359/642, 672, 359/197, 207, 208, 209, 210, 720, 721, 811

[56]     References Cited

U.S. PATENT DOCUMENTS

| | | | |
|---|---|---|---|
| 4,256,936 | 3/1981 | Kawaguchi | 359/672 |
| 4,273,410 | 6/1981 | Menke | 359/209 |
| 4,840,466 | 6/1989 | Vamada | 359/672 |
| 4,932,732 | 6/1990 | Nakajima | 359/210 |
| 5,027,144 | 6/1991 | Ohno | 359/672 |

*Primary Examiner*—Georgia Y. Epps
*Assistant Examiner*—Ricky Mack
*Attorney, Agent, or Firm*—W. Wayne Liauh

[57]     ABSTRACT

A multi-facet lens member for use in an optical device such as a conventional camera or a video camera, comprising: (a) a multi-facet optical lens having at least four optical surfaces arranged in at least two pairs, each pair of the optical surfaces being adapted to provide a predetermined effective focal length in a light path; and (b) a rotational member for rotating the multi-facet optical lens so as to position a desired pair of the optical surfaces in the light path and provide a desired effective focal length for the optical device. The multi-facet optical lens member can be used alone or in conjunction with other conventional optical lens to obtain optimum effect. In an example embodiment of a fouri-facet lens member, one arrangement of the optical surfaces provides an effective focal length of 25 mm, thus representing a wide-angle lens. By a simple 90 degrees rotation of the lens member, an effective length of 90 mm can be obtained, thus representing a telephoto lens, from the same optical device.

17 Claims, 7 Drawing Sheets

MULTI-FACET LENS COMPONENT

FIELD OF THE INVENTION

This invention relates to a multi-facet lens component that can be used in any optical system comprising single piece of lens components or a plurality of lens components for effectuating a large change in the focal length without having to change lens components. More specifically, the present invention relates to a multi-facet lens component having at least four optical surfaces for use, either alone or in conjunction with other optical lens components, in an optical device, such as a camera, so as to allow greater extent of focal lengths to be adjusted without having to change the lens component. This invention also relates to an optical device, such a conventional camera or a video camera, which provides a very wide range of focal lengths, including the wide-angle and telephoto, without the need to change optical lens.

BACKGROUND OF THE INVENTION

All the traditional lens components known to the present are provided with only two optical surfaces, i.e., the front surface and the rear surface. This construction limits the range within which the focal length can be varied. Although this problem has been ameliorated, to some extent, by the development of zooming lens groups or combination-lens products, either the resultant products are bulky, or only a limited extent of change in focal length can be obtained. Therefore, we are still dependent largely upon the use of interchangeable lens system for providing a wider variation range of focal length. For example, a camera user typically has to change to a wide-angle lens for wide-angle applications. Similarly, a telephoto lens is typically required for taking close-up shots of far-away objects. Recently, variable focal length cameras, from wide-angle to telephoto, have become available in the market. These cameras are very bulky and sometimes do not provide very good qualities.

With the ever-growing popularity of conventional and video cameras, and the need to have both the wide-angle and telephoto capabilities built into the same optical device without having to change optical lens components, it thus becomes very desirable to have an optical lens component, which can be used alone or in conjunction with other optical lens components, to provide a wide range of focal lengths, including both the wide-angle and the telephoto capabilities, with the same lens.

SUMMARY OF THE INVENTION

The primary object of present invention is to provide a novel lens component for use in an optical device such a conventional or video camera which can provide different focal lengths by a simple rotational adjustment. The novel lens component can be used alone or in conjunction with other optical lens components. More specifically, the primary object of the present invention is to provide a multi-facet optical lens component having at least two pairs of optical surfaces. Each pair of optical surfaces constitute a conventional lens component. By a simple rotation of the multi-facet optical lens component of the present invention, a different pair of optical surfaces can be placed in the path of the light rays so as to effectuate a different focal length, as if a different lens were used in the camera. Alternatively, the primary object of the present invention is to provide a camera having a compact volume but can effectuate a wide range of focal length changes by using the multi-facet optical lens components disclosed in the present invention.

In any conventional lens system known to the present, a combination of at least two lens groups, each group may contain more than one lens component and at least two of the lens groups are separated by an axially adjustable air space, are needed to provide varying focal length. Zooming is achieved by adjusting the axially adjustable air space. To achieve a greater change in the focal length, a different lens system, for example a wide-angle lens or a telephoto lens, is often needed.

The present invention can be used in a very wide range of applications. For example, a simple, or typically disposable camera, can be made containing only a single piece of the multi-facet lens component disclosed in the present invention. The camera user can obtain different focal length with a simple rotational adjustment of the multi-facet lens component so that different pairs of optical surfaces are placed in the light path. The multi-facet optical lens components of the present invention can also be used in zooming cameras having multiple lens group and an adjustable air space between the lens groups. By rotating the multi-facet lens component of the present invention, a completely different lens structure can be achieved, thus the camera can effectuate an even greater change in its effective focal length without having to change the optical lens.

BRIEF DESCRIPTION OF THE DRAWINGS

The present invention will be described in detail with reference to the drawing showing the preferred embodiments of the present invention, wherein.

DETAILED DESCRIPTION OF PREFERRED EMBODIMENTS

The present invention discloses a multi-facet lens component with a rotation-adjusting means so as to adjust the effective focal length of an optical device such as a conventional or video camera. The multi-facet lens component disclosed in the present invention can be used alone or in combination with other lens groups in a zooming operation to provide an even greater extent of changes in the effective focal length.

The multi-facet lens component disclosed in the present invention contains at least two pairs of optical surfaces. The term "optical surface" used in the present invention means a surface that can be placed in the path of light rays in an optical device such as a conventional camera such that the light rays can emit thereupon or transmit therefrom. Each pair of the optical surfaces in a specific multi-facet optical lens of the present invention can have the same radius of curvature, or they can be different; or one can be convex while the other is concave. One or more of the optical surfaces of the multi-facet lens component of the present invention can be made to be aspherical.

FIGS. 1 through 12 are schematic drawings showing various embodiments of the multi-facet optical lens component disclosed in this invention. Each of the four optical surfaces of the lens component can be convex or concave. On the other hand, each or both pairs of the optical surfaces can be biconvex, biconcave, concave-convex, biplano, plano-convex or plano-concave. Furthermore, one or more of the optical surfaces can be aspherical surfaces. From FIGS. 1 to 12, the pairs of optical surfaces are biconvex-biconvex, biconcave-biconcave, biconcave-biconvex, biconvex-(concave-convex), biconcave-(concave-convex), (convex-concave)-(convex-concave), biplano-biconcave, biplano-biconvex biplano-(convex-concave), (plano-convex)-(plano-concave), (plano-concave)-(plano-concave), and (plano-convex)-(plano-convex), respectively. Other arrangements are also possible.

Figure 1:
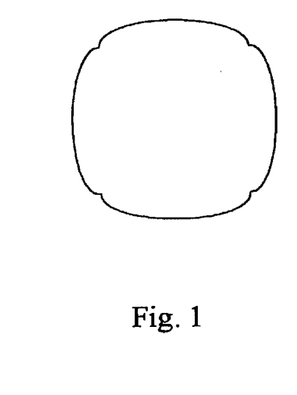
FIG. 1 is a schematic diagram of the first embodiment of the present invention.
Figure 2:
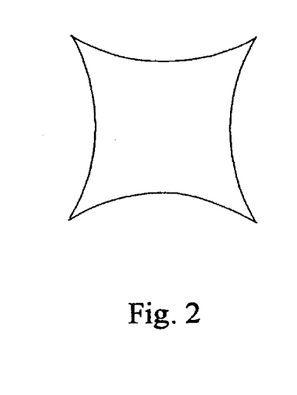
FIG. 2 is a schematic diagram of the second embodiment of the present invention.
Figure 3:
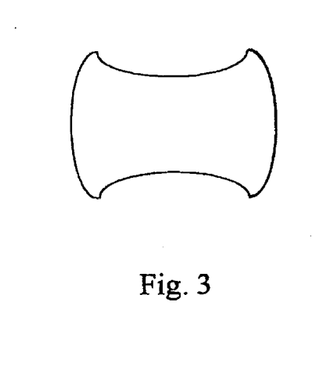
FIG. 3 is a schematic diagram of the third embodiment of the present invention.
Figure 4:
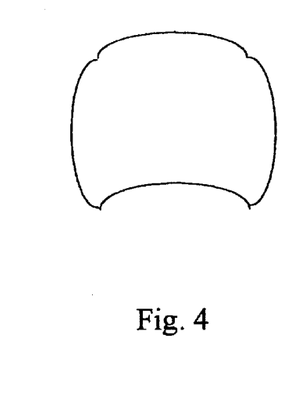
FIG. 4 is a schematic diagram of the fourth embodiment of the present invention.
Figure 5:
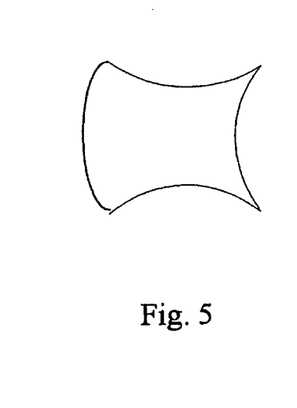
FIG. 5 is a schematic diagram of the fifth embodiment of the present invention.
Figure 6:
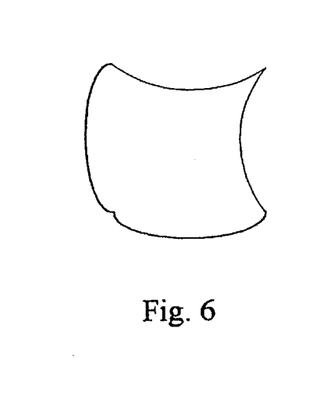
FIG. 6 is a schematic diagram of the sixth embodiment of the present invention.
Figure 7:
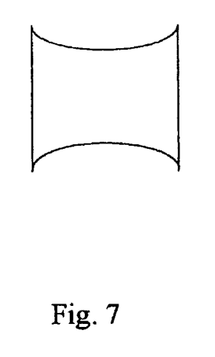
FIG. 7 is a schematic diagram of the seventh embodiment of the present invention.
Figure 8:
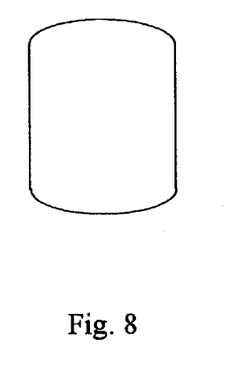
FIG. 8 is a schematic diagram of the eighth embodiment of the present invention.
Figure 9:
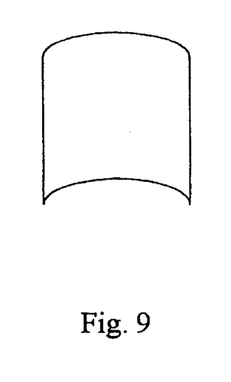
FIG. 9 is a schematic diagram of the ninth embodiment of the present invention.
Figure 10:
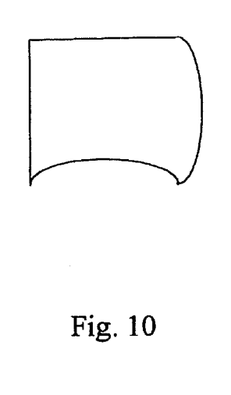
FIG. 10 is a schematic diagram of the tenth embodiment of the present invention.
Figure 11:
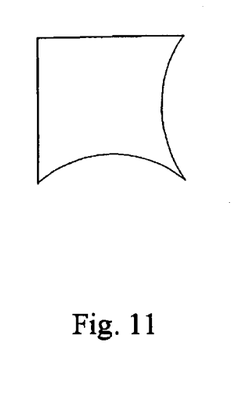
FIG. 11 is a schematic diagram of the eleventh embodiment of the present invention.
Figure 12:
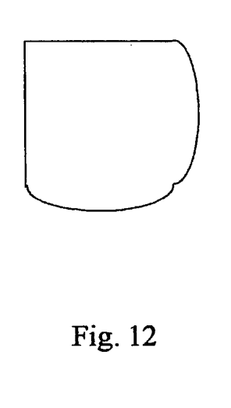
FIG. 12 is a schematic diagram of the twelfth embodiment of the present invention.
Figure 13:
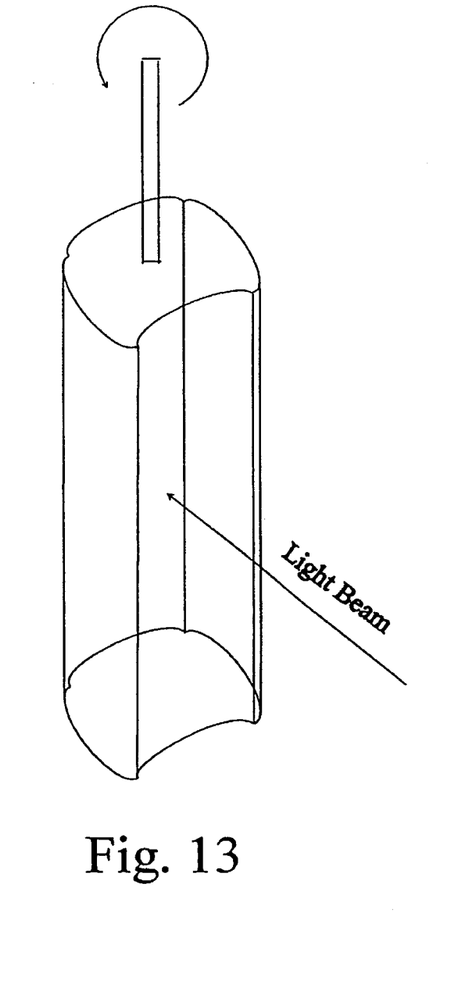
FIG. 13 is a schematic diagram of the rotational mechanism for use with the multi-facet lens component of FIG. 1.

FIG. 13 is a preferred mechanism for the management of rotation adjustment of the lens component as shown in FIG. 1. A stub protrusion located in Z direction other than X-Y optical surfaces direction, to be rotatory around 360 degree and each 90 degree step rotation adjustment is designed to obtain at most four different focal lengths in a four optical surfaces lens components.

The present invention will now be described more specifically with reference to the following example. It is to be noted that the following descriptions of example including preferred embodiment of this invention are presented herein for purpose of illustration and description; it is not intended to be exhaustive or to limit the invention to the precise form disclosed.

EXAMPLE 1A

Figure 14A:
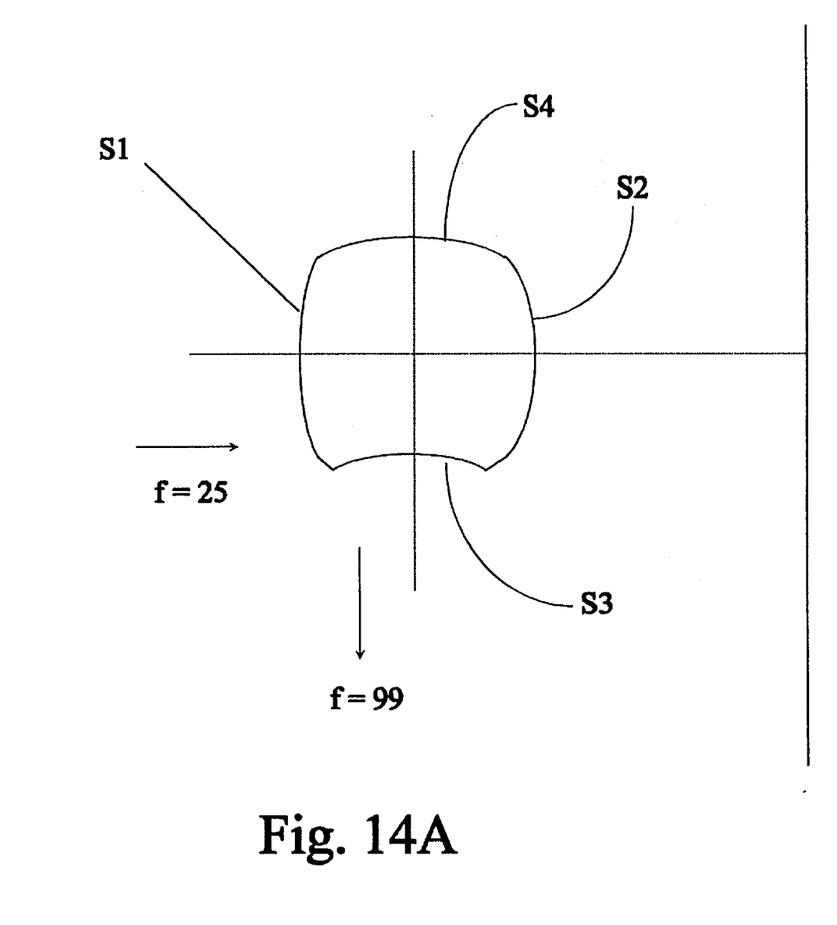
FIG. 14A is a side schematic view of a multi-facet optical lens component disclosed in the present invention having four optical surfaces.

In FIG. 14A, it is shown a side schematic view of a multi-facet optical lens component disclosed in the present invention having four optical surfaces, S1, S2, S3, and S4, S1, S2 and S4 are concave surfaces and S3 is a convex surface. The parameters of the optical surfaces are summarized in Table 1. Furthermore, S1 and S3 are aspherical surfaces whose parameters are shown in Table 2.

The characteristic of an aspherical surface is obtained by the following formula:

$$Z = \frac{(CURV)Y^2}{1+[1-(1+k)(CURV)^2Y^2]^{1/2}} + AY^4 + BY^6 + CY^8 + DY^{10}$$

wherein:

Z: is the sag of the lens parallel to the Z-axis;

CURV: is the curvature of the pole of the surface;

k: is the Konic coefficient;

Y; is the height of the lens from the optical axis of the lens system;

A: is the 4th order deformation coefficient;

B: is the 6th order deformation coefficient;

C: is the 8th order deformation coefficient;

D: is the 10th order deformation coefficient.

The lens component is placed in a camera such that optical surfaces S1 and S2 are in the light path as shown in FIG. 14A. The effective and back focal lengths for this arrangement are calculated to be 25 mm and 19.11 mm, respectively. The lens component in this arrangement assumes the characteristic of a wide-angle lens.

EXAMPLE 1B

Figure 14B:
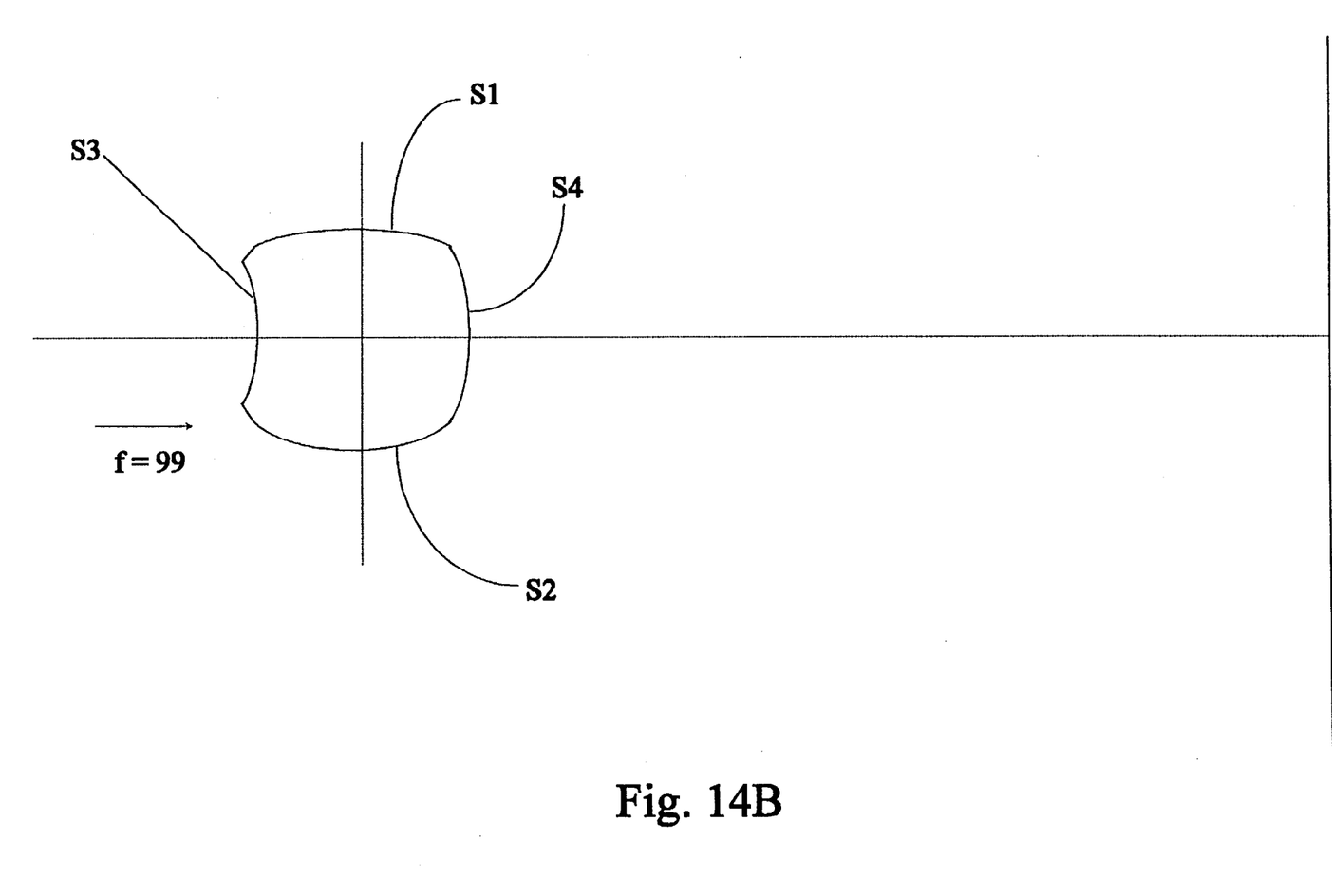
FIG. 14B is a side schematic view of the same multi-facet optical lens disclosed in FIG. 14A rotated 90 degrees.

FIG. 14B shows the same side schematic view of the multi-facet optical lens component as shown in FIG. 14A, except that the lens was rotated 90 degrees. The lens component is placed in a camera such that optical surfaces S3 and S4 are in the light path as shown in FIG. 14B. The effective and back focal lengths for this arrangement are calculated to be 69.98 mm and 80.12 mm, respectively. The lens component in this arrangement assumes the characteristic of a telephoto lens. Comparing Examples 1A with 1B, a change of effective focal lengths at a ratio 2.8:1 can be effectuated by a simple rotation of the optical lens component.

TABLE 1

| Surface Number | r | d | n | v | EFL | BFL |
|---|---|---|---|---|---|---|
| 1 | 23.70334 | 17.00 | 1.487927 | 70.2957 | 25 (FIG. 14A) | 19.11 (FIG. 14A) |
| 2 | −19.34203 | 17.00 | 1.487927 | 70.2957 | 69.98 (FIG. 14B) | 80.12 (FIG. 14B) |
| 3 | −38.56876 | 17.00 | 1.487927 | 70.2957 | | |
| 4 | −20.77254 | 17.00 | 1.487927 | 70.2957 | | |

In Table 1, the refractive index n and the Abbe number v are values for the d-line ($\lambda$= 587.6 nm)

TABLE 2

| Surface Number | K | Aspherical coefficient | | | |
| --- | --- | --- | --- | --- | --- |
| | | A | B | C | D |
| 1 | 0 | −0.105651E-03 | 0.818962E-06 | −0.107160E-07 | 0.408826E-10 |
| 2 | 0 | −0.30455E-04 | 0.787311E-07 | 0.627248E-08 | −0.169571E-09 |

EXAMPLE 2A

Figure 15A:
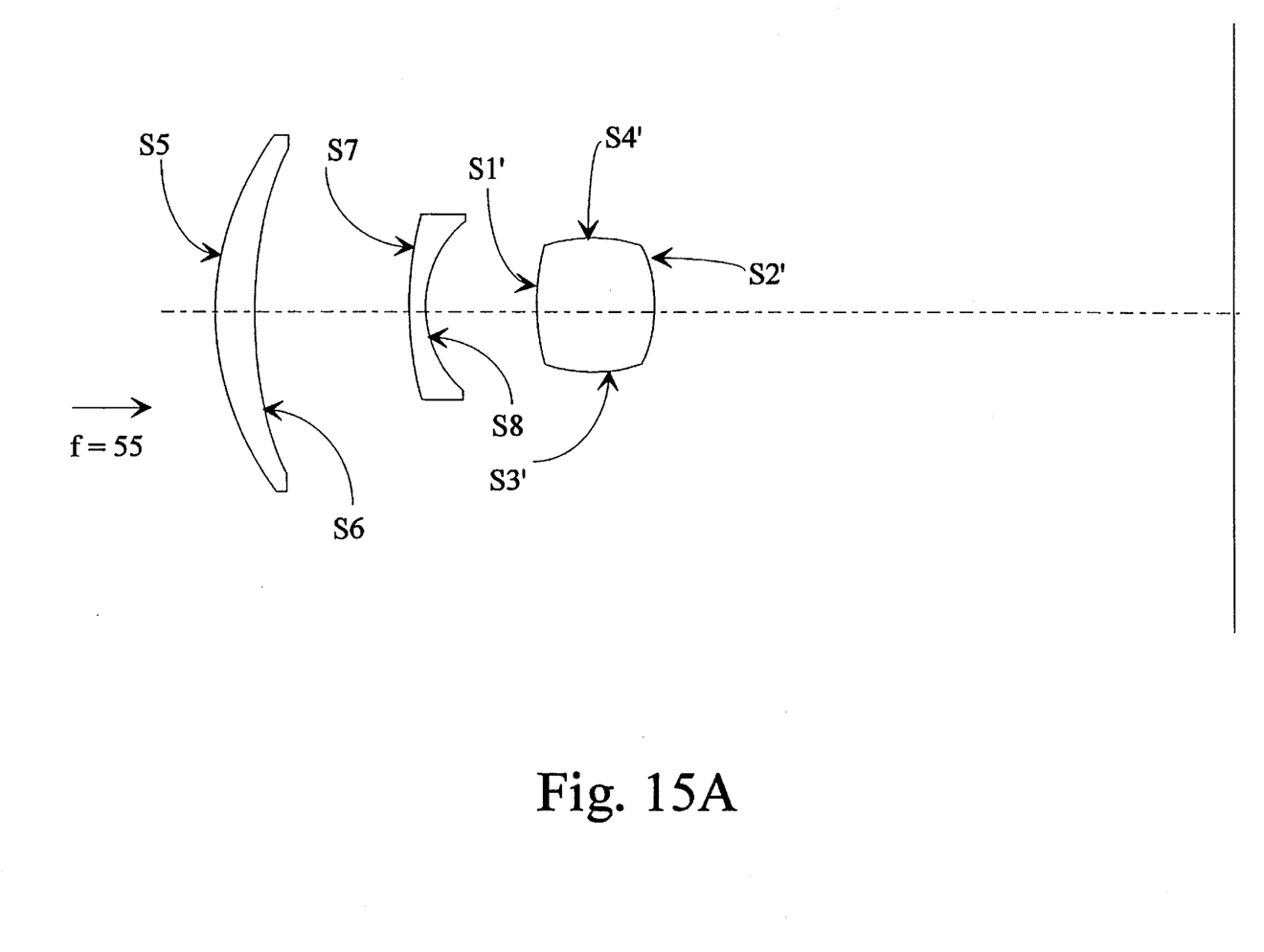
FIG. 15A is a side schematic view of a lens group containing a multi-facet optical lens in the present invention in combination with two other conventional lenses.

A multi-facet optical lens 20 was used in a different camera in combination with two other conventional lenses 30 and 40 as shown in FIG. 15A. The multi-facet optical lens has four optical surfaces, S1', S2', S3', and S4', all of them are concave surfaces. The parameters of the optical surfaces of the multi-facet lens 20 and the conventional lenses 30 and 40 are summarized in Table 3.

TABLE 3

| Surface Number | r | d | n | v | EFL | BFL |
| --- | --- | --- | --- | --- | --- | --- |
| 5 | 49.91584 | 2.48555 | 1.75168 | 27.7353 | 55 (FIG. 15A) | 71 (FIG. 15A) |
| 6 | 68.72711 | 20.024699 | 1.75168 | 27.7353 | 90 (FIG. 15B) | 127.6529 (FIG. 15B) |
| 7 | 193.20391 | 1.0 | 1.745877 | 40.378 | | |
| 8 | 14.82674 | 14.513134 | 1.745877 | 40.378 | | |
| 1' | 35.40421 | 16.821959 | 1.576955 | 62.7597 | | |
| 2' | −29.50996 | | 1.576955 | 62.7597 | | |
| 3' | 73.46614 | 13.177096 | 1.576955 | 62.7597 | | |
| 4' | −25.33909 | 18.157997 | 1.576955 | 62.7597 | | |

In Table 3, the refractive index n and the Abbe number v are values for the d-line ($\lambda$= 587.6 nm); and d is the distance between a respective pair of optical surfaces.

The lens components 20, 30 and 40 are placed in a camera such that optical surfaces S1' and S2' of the multi-facet lens 20 are in the light path as shown in FIG. 15A. The effective and back focal lengths for this arrangement are calculated to be 55 mm and 71.4712 mm, respectively.

EXAMPLE 2B

Figure 15B:
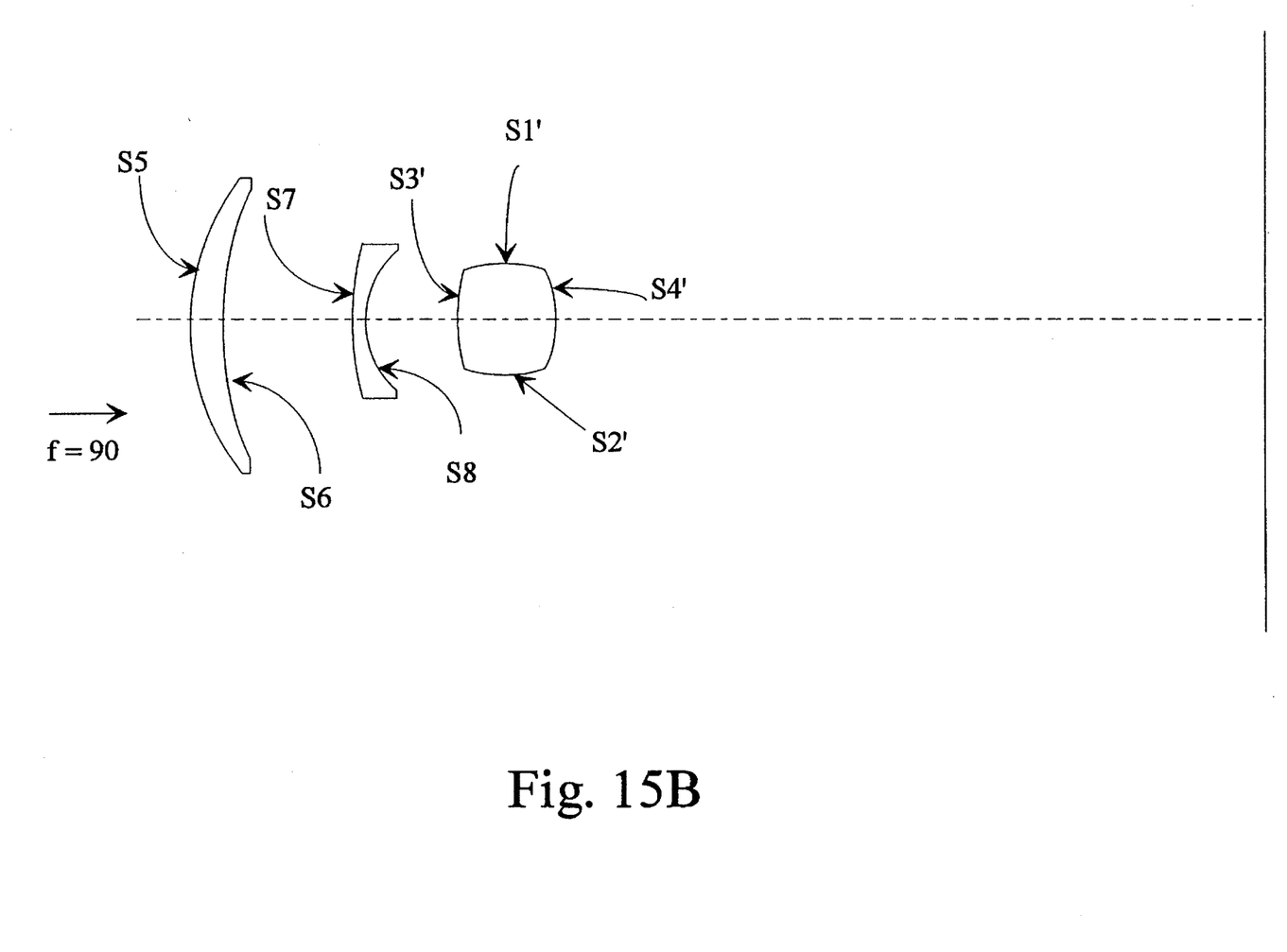
FIG. 15B is a side schematic view of the lens group disclosed in FIG. 15A except that the multi-facet optical lens is rotated 90 degrees.

FIG. 15B shows the same side schematic view of the lens arrangement as shown in FIG. 15A, except that the multi-facet lens 20 was rotated 90 degrees. The multi-facet lens component 20 is placed in the camera such that optical surfaces S3' and S4' are in now the light path as shown in FIG. 15B. The effective and back focal lengths for this arrangement are calculated to be 90 mm and 127.6529 mm, respectively. Comparing Examples 1A with 1B, a change of effective focal lengths at a ratio 1.636:1 can be effectuated in a multiple-component lens system by a simple rotation of the multi-facet optical lens component.

The foregoing description of the preferred embodiments of this invention has been presented for purposes of illustration and description. Obvious modifications or variations are possible in light of the above teaching. For example, while the invention has been described in only four optical surfaces lens component, it is understood that variations and modifications such as much more optical surfaces and modified radius of curvature to convex and concave surfaces may be made by those having ordinary skill in the art without departing from the scope of the invention. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A multi-facet lens member for use in an optical device, comprising:
   (a) a multi-facet optical lens having at least four optical surfaces arranged in at least two pairs, each pair consisting of two of said optical surfaces that are disposed on opposite sides of a common longitudinal axis of said optical lens to provide a predetermined effective focal length in a light path, at least one of said optical surfaces being a curved surface; and
   (b) a rotational means for rotating said multi-facet optical lens about said longitudinal axis so as to position a desired pair of said optical surfaces in said light path and effectuate a desired effective focal length.

2. A multi-facet lens member according to claim 1, wherein said multi-facet optical lens comprising two pairs of biconvex optical surfaces.

3. A multi-facet lens member according to claim 1, wherein said multi-facet optical lens comprising two pairs of biconcave optical surfaces.

4. A multi-facet lens member according to claim 1, wherein said multi-facet optical lens comprising a pair of biconvex optical surfaces and a pair of biconcave optical surfaces.

5. A multi-facet lens member according to claim 1, wherein said multi-facet optical lens comprising a pair of biconvex optical surfaces and a pair of convex-concave optical surfaces.

6. A multi-facet lens member according to claim 1, wherein said multi-facet optical lens comprising a pair of biconcave optical surfaces and a pair of convex-concave optical surfaces.

7. A multi-facet lens member according to claim 1, wherein said multi-facet optical lens comprising two pairs of convex-concave optical surfaces.

8. A multi-facet lens member according to claim 1, wherein said multi-facet optical lens comprising a pair of biplano optical surfaces and a pair of biconcave, biconvex or concave-convex surfaces.

9. A multi-facet lens member according to claim 1, wherein said multi-facet optical lens comprising at least a pair of plano-convex or plano-concave optical surfaces.

10. A multi-facet lens member according to claim 1, wherein said multi-facet optical lens comprising two pairs of plano-convex optical surfaces.

11. A multi-facet lens member according to claim 1, wherein said multi-facet optical lens comprising two pairs of plano-concave optical surfaces.

12. A multi-facet lens member according to claim 1, wherein said multi-facet optical lens comprising at least one aspherical optical surface.

13. A multi-facet lens member according to claim 1, wherein each pair of said multi-facet optical lens comprising at least one aspherical optical surface.

14. An optical instrument with adjustable effective focal lengths containing a multi-facet lens member, said multi-facet lens member comprising:

(a) a multi-facet optical lens having at least four optical surfaces arranged in at least two pairs, each pair consisting of two of said optical surfaces that are disposed on opposite sides of a common longitudinal axis to provide a predetermined effective focal length in a light path, at least one of said optical surfaces being a curved surface; and (b) a rotational means for rotating said multi-facet optical lens about said longitudinal axis so as to position a desired pair of said optical surfaces in said light path and effectuate a desired effective focal length.

15. An optical instrument with adjustable effective focal length according to claim 14 which further comprising double-facet optical lens components in cooperation with said multi-facet optical lens member, each of said double-facet optical lens components consisting of two optical surfaces.

16. An optical instrument with adjustable effective focal length according to claim 15 which further comprising an adjustable air space between said double-facet optical lens components and said multi-facet optical lens member to provide zoom operation.

17. A method for adjusting focal length in an optical device comprising the steps of (a) obtaining a multi-facet lens member having a multi-facet optical lens and a rotational means for rotating said multi-facet optical lens about a longitudinal axis, said multi-facet optical lens having at least four optical surfaces arranged in at least two pairs, each pair consisting of two of said optical surfaces that are disposed on opposite sides of said common longitudinal axis to provide a predetermined effective focal length in a light path, at least one of said optical surfaces being a curved surface; and (b) rotating said multi-facet optical lens using said rotating means so as to position a desired pair of said optical surfaces in said light path and effectuate a desired effective focal length.

* * * * *